United States Patent
Shinjo et al.

(10) Patent No.: US 7,559,136 B2
(45) Date of Patent: Jul. 14, 2009

(54) PRESS FOR ATTACHING NUTS TO PIPES

(75) Inventors: Tadashi Shinjo, Osaka (JP); Takashi Otani, Osaka (JP)

(73) Assignee: Shinjo Manufacturing Co., Ltd., Osaka (JP)

( * ) Notice: Subject to any disclaimer, the term of this patent is extended or adjusted under 35 U.S.C. 154(b) by 423 days.

(21) Appl. No.: 11/405,468

(22) Filed: Apr. 18, 2006

(65) Prior Publication Data
US 2006/0243101 A1  Nov. 2, 2006

(30) Foreign Application Priority Data
Apr. 18, 2005  (JP)  ............................. 2005-119406

(51) Int. Cl.
*B23P 19/06* (2006.01)
(52) U.S. Cl. ............... 29/798; 29/243.518; 29/243.519; 29/432.2; 29/714; 29/716
(58) Field of Classification Search ............... 29/798, 29/243.5, 243.517, 243.518, 243.519, 243.55, 29/432.1, 432.2, 510, 714, 715, 716
See application file for complete search history.

(56) References Cited
U.S. PATENT DOCUMENTS

| | | | | |
|---|---|---|---|---|
| 3,590,533 A | * | 7/1971 | Samson et al. | ............... 451/146 |
| 3,602,974 A | * | 9/1971 | Koett | ......................... 29/243.5 |
| 3,811,171 A | * | 5/1974 | Grube | ......................... 29/56.6 |
| 3,851,373 A | * | 12/1974 | Shinjo | ......................... 29/432.2 |
| 3,877,133 A | * | 4/1975 | Grube | ......................... 29/417 |
| 4,265,320 A | * | 5/1981 | Tanaka et al. | ............... 173/178 |
| 4,358,073 A | * | 11/1982 | Eickmann | ................... 244/12.1 |
| 4,456,430 A | * | 6/1984 | Eickmann | ............... 416/170 R |
| 4,630,528 A | * | 12/1986 | Eickmann | ..................... 91/491 |
| 5,182,861 A | * | 2/1993 | Suzuki et al. | ................. 33/18.1 |
| 5,329,694 A | * | 7/1994 | Sickels et al. | ................. 29/798 |

(Continued)

FOREIGN PATENT DOCUMENTS
JP  53-16394  5/1978

*Primary Examiner*—David P Bryant
*Assistant Examiner*—Sarang Afzali
(74) *Attorney, Agent, or Firm*—Antonelli, Terry, Stout & Kraus, LLP.

(57) ABSTRACT

A press for attaching nuts to pipes has a lower holder (6) fitting in and holding a pipe (60). A basal portion of this holder supported on the rear part of a lower base (2) moves up and down, and its forward portion extends to the front part of a lower base. Lifters (30) bear against and support the forward portion so as to keep it lifted a slight distance. Stoppers (31) bear against and support an intermediate region of the holder to be lifted a slight distance, and also bear against an end of the pipe (60) and retaining it at a prescribed position. A nut feed passage (10) extends in an outer surface of the lower holder from its basal to forward portion, and a nut pusher (14) is disposed in the forward portion. A cam rod (21) inserted in the lower holder (6) has a frontal oblique cam surface (22) for driving the pusher (14) to a nut releasing position (12), and a cam actuating means (25) is for the rod. An upper holder (3) moves in a direction perpendicular to the lower holder (6), a caulking die (47) is carried by the upper holder (3), and a die driving means (50) is for the caulking die, such that the press is rendered easy to automate.

16 Claims, 6 Drawing Sheets

U.S. PATENT DOCUMENTS

| | | | |
|---|---|---|---|
| 5,587,633 A * | 12/1996 | Aoki et al. | 318/164 |
| 5,661,954 A * | 9/1997 | Ivanov et al. | 53/430 |
| RE35,619 E * | 10/1997 | Muller | 29/716 |
| 6,036,802 A * | 3/2000 | Banks et al. | 156/197 |
| 6,161,279 A * | 12/2000 | Suboski | 29/798 |
| 6,168,009 B1 * | 1/2001 | Asai et al. | 198/468.4 |
| 6,220,072 B1 * | 4/2001 | Tado et al. | 72/299 |
| 6,336,548 B1 * | 1/2002 | Asai et al. | 198/468.4 |
| 6,357,109 B1 * | 3/2002 | Shinjo | 29/798 |
| 6,796,020 B2 * | 9/2004 | Thompson | 29/712 |

* cited by examiner

PRESS FOR ATTACHING NUTS TO PIPES

FIELD OF THE INVENTION

The present invention relates to a press for attaching nuts to the insides of pipes that are particularly rectangular metal pipes.

BACKGROUND ART

Self-piercing nuts are known in the art, wherein each nut itself punches a hole in a metal sheet or panel so that the rim of this hole is simultaneously caulked and pressed into the nut's side groove. Also known in the art is an apparatus constructed to attach each nut in this manner particularly to the inner wall surface of a metal. This nut will be used to engage with a screw driven inwards from the outside of the pipe, and such a prior art is disclosed in the Patent Document 1.

The apparatus proposed in this document was of a manually-operating type and has gotten out of date year by year and up to now, thus failing to be used widely.

Patent Document 1: Japanese Patent Publication No. 53-16394

SUMMARY OF THE INVENTION

Objects of the present invention are to improve the prior art apparatus shown in Patent Document 1 for attaching nuts to pipes in such manner that its operation can easily be automated.

As a solution, a press of the invention comprises, as the preamble features: a frame (1) and an elongated and generally cylindrical lower holder (6) disposed in the frame and having a horizontal axis in parallel therewith, the frame (1) being composed of a lower base (2) and an upper base (3), with the upper base being supported by guide posts (4) and a rear wall (5), that are fixed upright on a front part and on a rear part of the lower base (2), respectively, the lower holder (6) capable of fitting in and temporarily holding a pipe (60), and having a basal portion supported on the rear part so as to rise and sink, and a forward portion of the lower holder (6) extending to a position where it is generally in vertical alignment with the front part of the lower base (2). The present press further comprises characteristically: lifters (30) and stoppers (31), such that the lifters move up and down to bear against and support the forward portion of the lower holder (6) so as to keep it lifted a slight distance, the stoppers (31) also moving up and down to bear against and support an intermediate region of the lower holder (6) in order to keep it lifted a slight distance, and further capable of bearing against an end of the pipe (60) and retaining it at a prescribed horizontal position, a nut feed passage (10) and a nut supply hose (11), with the passage (10) being formed along the axis and in an upper outer surface of the lower holder (6), the nut supply hose (11) being connected to a basal end of the feed passage (10) extending from the basal portion to the forward portion of said holder (6), a nut sensor (13) for detecting self-piercing nuts (61) at a nut releasing position (12) adjacent to a frontal end of the feed passage (10), a nut pusher (14) disposed in the forward portion of the cylindrical lower holder (6) so as to move perpendicularly to the axis thereof towards and away from the nut releasing position (12), a cam rod (21) inserted in the lower holder (6) and capable of moving axially thereof, the cam rod having a frontal end formed as an oblique cam surface (22) always engaging with the nut pusher (14) so as to drive it to the releasing position (12), a cam actuating means (25) causing the cam rod (21) to make axial reciprocation, an upper holder (7) capable of moving up and down along the guide posts (4) perpendicularly to the axis of the lower holder (6), a caulking die (47) carried by the upper holder (7) in a vertical alignment with the nut pusher (14), with the nut releasing position (12) intervening between the caulking die (47) and the nut pusher, and a die driving means (50) disposed on the upper base (3) in order to drive the upper holder (7) to reciprocate perpendicularly to the axis of the lower holder (6), such that the driving means exerts a downward force urging downwards the caulking die (47) is prescribed to be stronger than an upward force acting on the nut pusher (14).

The lifters have each a top formed as an inclined guide surface, and springs retained in the lower base urge upwards the lifters to bear against the lower holder. When a pipe is fitted on the lower holder, the guide surface will allow the pipe to move over it, while lowering the lifters.

The stoppers may be touch sensors such that once the end face of a pipe fitted on the lower holder do contact them so as to be accurately positioned, both the cam actuating and die driving means are automatically turned on.

The caulking die may be connected by a die holder and a back plate to the upper holder, and a scrap discharging canal formed through the back plate may be opened sideways in communication with a cavity or bore of the caulking die.

A locking lug protruding downwards from the basal portion of the lower holder may fit in a locking groove formed in the lower base, thereby regulating the position of the lower holder fore and aft and sideways, while permitting its free vertical motion.

In a case wherein the pipe is a rectangular one, it may be desired to attach the nuts to all the four parallel walls. Both the opposite side walls as well as a bottom wall of the elongated lower holder rectangularly cylindrical in this case may have relief grooves. These grooves extending from the forward portion to basal portion of this holder will protect it from interference with any nuts already attached to the pipe.

The press of the structure as summarized above enables the efficient fixing of nuts to any pipes from the outside thereof, particularly to rectangular metal pipes, without previously punching holes therein.

The press of the present invention can be automated easily and readily to further facilitate such a fixing of the nuts to the inner periphery of any pipe.

THE PREFERRED EMBODIMENTS

Now some embodiments of the present invention will be described referring to the accompanying drawings.

FIGS. 1 to 4 show a press provided herein for use to attach any required nuts to any required pipe. Particularly, this press may operate to fixedly attach self-piercing nuts 61 to the inner periphery of a rectangular pipe 60 (see FIGS. 5 and 6), as will be detailed later. A frame 1 of the press is constructed such that two guide posts 4 in parallel with each other are firmly connected upright to a front part of a lower base 2. A rear wall 5 is fixed upright to a rear part of the lower base 2 so as to cooperate with the guide posts 4 to fixedly support an upper base 3 of this frame 1.

A lower holder 6 is a rectangular and elongated body extending above the lower base 2 and fore and aft to keep a generally horizontal position. An upper holder 7 is a flat plate disposed near and below the upper base 3 such that it can move up and down along the guide posts 4 in a direction perpendicular to an axis of the lower holder 6.

The lower holder 6 has a front end formed as a tapered guide end 8, and a locking lug 9. This lug 9 depending from the lower holder is a relatively short rectangular parallelepiped fitting in a locking groove 9', that is formed in the lower bases 2. Due to such an engagement of the lug 9 with the groove 9', the lower holder 6 can neither move fore and aft nor sideways, but can rise or sink relative to the lower base. A nut feed passage 10 is formed along the axis and in an upper outer surface of the lower holder 6, so as to extend from the basal potion to the forward portion thereof. A nut supply hose 11 is connected to a basal end of the feed passage 10, and a nut supplier (not shown) such as a parts feeder is connected to this hose. Self-piercing nuts (hereinafter referred simply to nuts) 61 automatically delivered from the nut supplier will be directed into the passage 10 through the hose 11. A nut releasing position or station 12 is located at a frontal end of the nut feed passage 10, and a nut sensor 13 is located close to a tip end of the forward portion of lower holder 6. The nuts thus automatically transported to said releasing position will be detected with the sensor 13. In order to attach the nuts 61 to all of the four parallel walls of a rectangular pipe 60, both the opposite lateral walls as well as a bottom wall of the lower holder 6 may have relief grooves 65 formed therein. These grooves extend from the forward portion to basal portion of this holder, so as to allow the pipe 60 to be fitted thereon even if the nuts 61 have been attached to one, two or three of its parallel walls. Those nuts already attached and protruding inwards will smoothly slide along the relief grooves 65.

Figure 1:
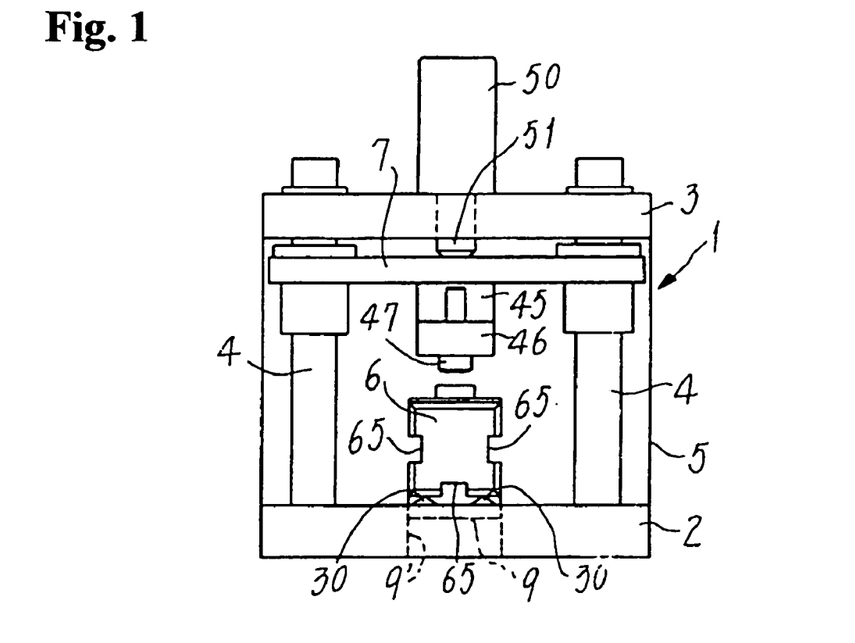
FIG. 1 is a front elevation of a press provided herein for use to attach any required nuts to any required pipe.
Figure 2:
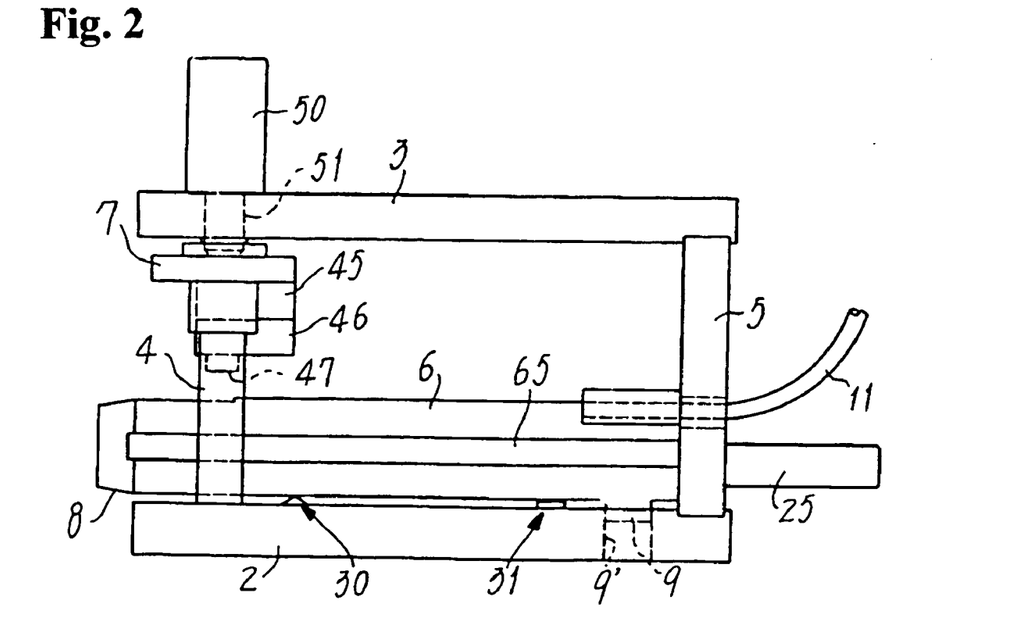
FIG. 2 is a side elevation of the press shown in FIG. 1.
Figure 3:
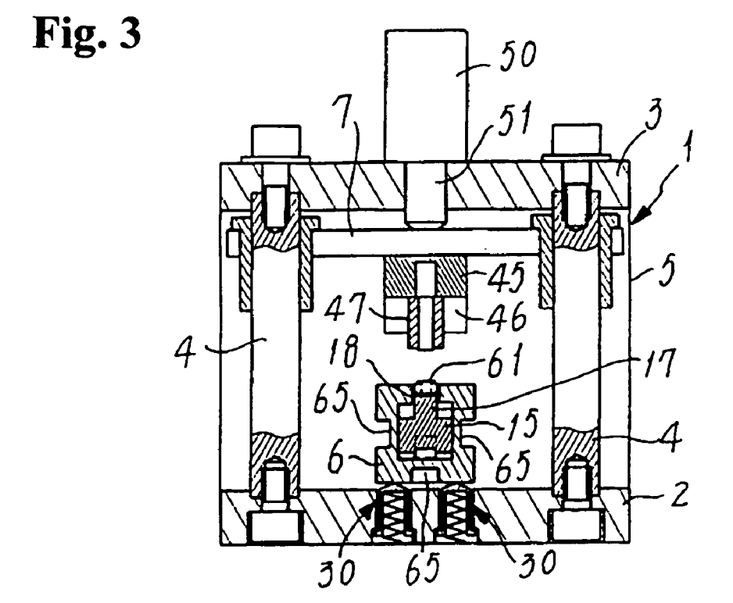
FIG. 3 is a front elevation of the press, with its principal parts being shown partly in cross section.
Figure 4:
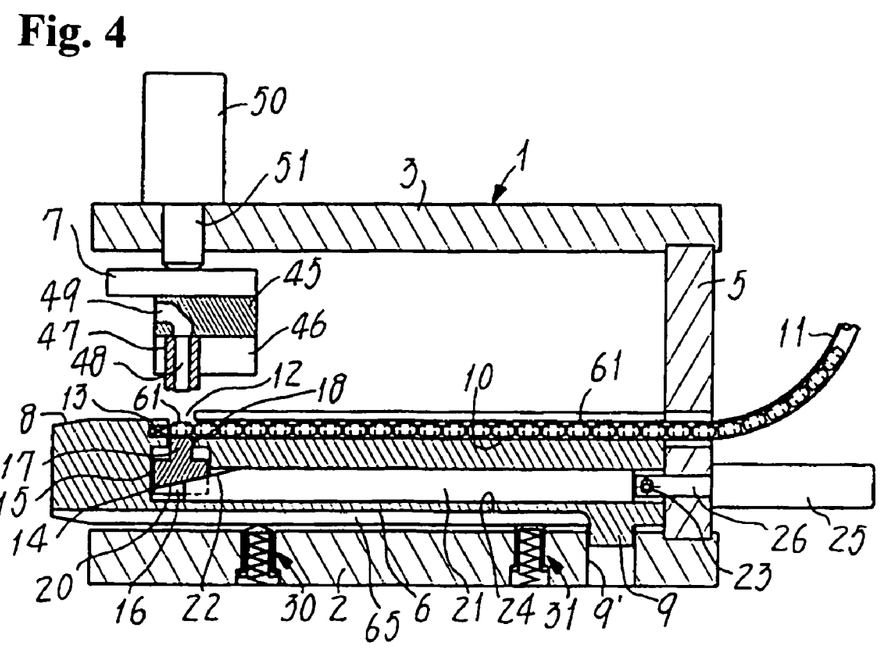
FIG. 4 is a side elevation of the press, also with its principal parts being shown partly in cross section.

As shown in FIGS. 3 and 4, a pusher 14 is fitted in a recess formed in the forward portion of lower holder 6. Every nut 61 then at the releasing position will be forced upwards by this pusher whose body 15 has a bottom groove 16. The body 15 thus generally arch-shaped in cross section has an integral punching part 17 for pushing the nut 61. The pusher 14 that is held in this fashion in the lower holder 6 is ready for reciprocation perpendicular to the axis thereof. As will be seen best in FIG. 9, the punching part 17 will be retractably projected into the nut feed passage 10, through an aperture 18 communicating with releasing position 12. A compression spring 19 always urges downwards each pusher 14 towards its inoperative home position provided within lower holder 6. A longitudinal middle zone of the bottom groove 16 of pusher body 15 is formed as a slope 20 engaging with a cam surface 22 of a cam rod 21, as mentioned below.

Figure 10A:
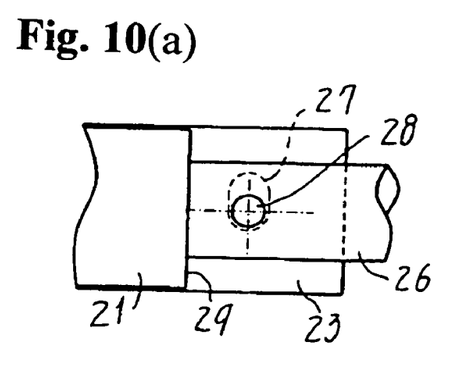
FIGS. 10(a) and 10(b) are side elevations of a cam rod connected to an oil-hydraulic cylinder
Figure 10B:
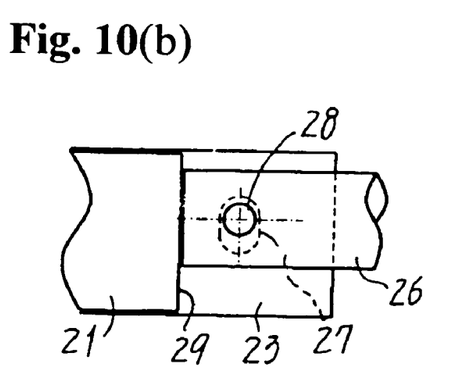

The cam rod 21 is a rectangular parallelepiped member, whose distal end is kept in engagement with the groove 16 of pusher 14, and the slope 20 thereof is always in a sliding contact with a slanted cam face 22 of this cam rod. A bore 24 extending axially of the lower holder 6 from its basal portion receives and allows the cam rod 21 to slide therein. A tying ear 23 integral with the proximal end of cam rod is operatively connected to a piston rod 26. This rod 26 extends forwards from an oil-hydraulic cylinder 25 that serves as the cam-actuating means as noted above. As best seen in FIGS. 10(a) and 10(b), an elliptic hole 27 opened in the ear 23 and extending vertically will receive a pin 28 connected to the piston rod 26. Vertical strokes of the lower holder 6 are ensured thanks to this pin 28 moveable within the elliptic hole 27. With the cylinder 25 being activated, a distal end face of the piston rod 26 will thrust the cam rod 21 at its proximal end face 29, thereby causing a forward displacement of the cam rod towards the forward portion of lower holder 6.

Lifters 30 disposed in the lower base 2 are capable of vertical motion a slight distance much smaller than the diameter of lower holder. The forward portion of the lower holder 6 will thus tend to be raised the distance due to those lifters 30 bearing against it. Stoppers 31 also moving up and down and supporting the lower holder 6 at its intermediate region near its basal portion are likewise disposed in the lower base 2. The intermediate portion thus tends similarly to be raised the same distance as the forward portion, but due to the effect of stoppers 31. As detailed later, the rectangular pipe 60 fitted on the lower holder 6 will have its end face 62 to butt at those stoppers so as to be positioned accurately.

Figure 11:
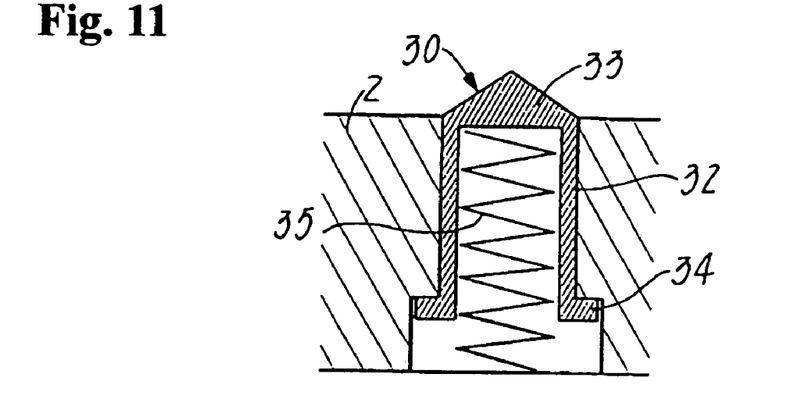
FIG. 11 is a partially cross-sectional side elevation of one of lifters incorporated in the press.

As shown in FIG. 11, the lifters 30 have each a guide surface 33 formed as a conical top of a cylindrical body 32, which also has at its bottom a flange 34. This body movable up and down is disposed in the lower base 2 and urged upwards by a compression spring 35 so that its conical top protrudes up from an upper surface of said base 2. The cylindrical body's conical top 33 supports the forward portion of lower holder 6 to be raised the distance also referred to above. However, the compression spring 35 can be compressed when the cylindrical body 32 is forced downwards.

The bottom flange 34 limits the degree to which the conical top 33 can protrude upwards. A single lifter 30 of the described feature may suffice in certain cases, but should not interfere with the relief groove 65. This groove is formed, as described above, in the lower face of lower holder 6 for free movement of the nuts 61 already attached to the pipe 60. Therefore, the present embodiment employs two of such lifters 30 that are transversely arranged side by side as shown in FIG. 3.

Figure 12:
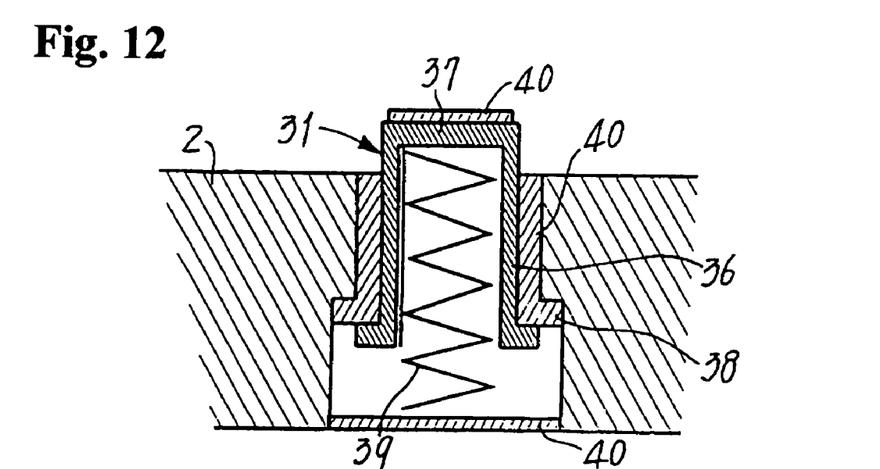
FIG. 12 is a partially cross-sectional side elevation of one of stoppers incorporated in the press.

As shown in FIG. 12, the stoppers 31 are each composed of a cylindrical body 36 having a flat top 37 and a bottom flange 38. This body disposed in the lower base 2 is movable up and down, and its top 37 normally takes a position raised above this base. The flat top 37 bears against and slightly raise the lower base 2 at its intermediate region near the basal portion. The end face 62 of a rectangular pipe 60 fitted on the lower holder 6 will collide with the side of cylindrical body 36 so as to take a prescribed position (see FIG. 6). Either or both of the stoppers 31 may function as a touch sensor, if its body 36 is made of a conductive metal, with insulating elements 40 being interposed one between the lower base 2 and the body 36 and the other between the lower holder 6 and said body. In this case, once the end face 62 of pipe 60 on the holder 6 touches the side of cylindrical body 36 so as to exactly position this pipe, the stopper 31 serving as a sensor will immediately activate both the oil-hydraulic cylinder 25 and another one 50 described below.

Figure 13:
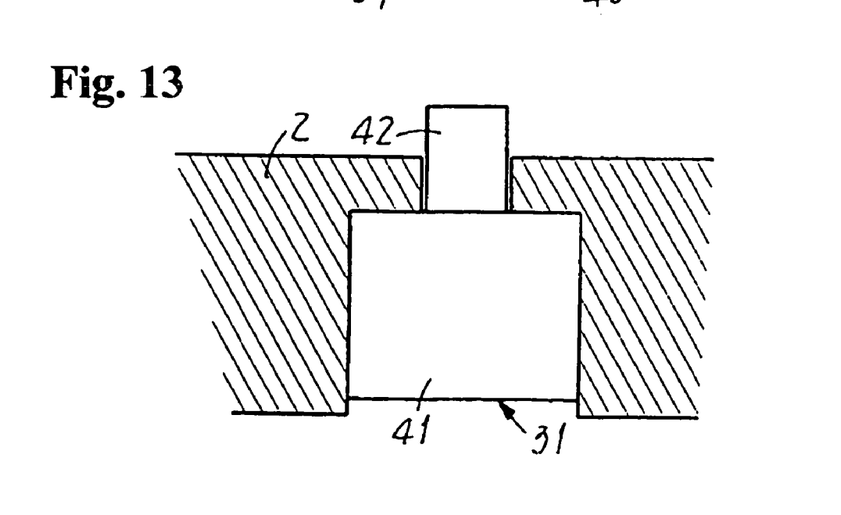
FIG. 13 is a partially cross-sectional side elevation of one of alternative modified stoppers also incorporated in the press.

Alternatively as shown in FIG. 13, the stoppers 31 may be composed each of a pneumatic cylinder 41 with a piston rod 42 protruding up from the upper surface of lower base 2. This rod will press up lower holder 6 by the distance, similarly to the flat top as mentioned above. In this case, a row of pneumatic cylinders 41 disposed in the lower base may be arranged at intervals longitudinally of the lower holder. It may be possible to individually control those cylinders 41 with regard to extension and retraction of their piston rods 42. The pipe 60 fitting on the lower holder 6 will thus be stopped successively at different positions so as to attach plural nuts 61 to one and the same pipe 60.

On the other hand, a caulking die 47 is secured to a die holder 46, which in turn is connected to the upper holder 7. A scrap discharging canal 49 communicating with and extending up from a bore 48 of the die 47 is formed through the back plate 45 and opened sideways. A piston rod 51 extending from the another oil-hydraulic cylinder 50 that serves as the die driving means mentioned above and mounted on the upper base 3 is operatively connected to the upper holder 7. Thus, this cylinder 50 drives the upper holder to rise or sink along the guide posts 4. The caulking die 47 is always kept in alignment with the pusher 14, across the nut releasing position 12. When the piston rod 51 of cylinder 50 drives downwards the upper holder 7, the die 47 will be brought into a forced contact with the rectangular pipe 60, thereby urging it to the lower base 2. Such a downward force of the cylinder 50 acting on the caulking die 47 is designed stronger than an upward force which the first mentioned cylinder 25 imparts to said die.

The press of the present invention will operate as follows Referring to FIGS. 5 and 6, they show the preparatory step performed in every cycle of operation. It will be seen there that a rectangular metal pipe 60 has to be fitted at first on the lower holder 6 so as to take a prescribed position. For this purpose, the tapered guide end 8 will guide an end opening of the pipe 60 into alignment with the forward portion of the holder 6. As the pipe advances towards the basal portion of said holder, the end face 62 of said rectangular pipe will collide with the conical guide surfaces of lifters 30. Consequently, these lifters are forced downwards against the elastic force of springs 35, thus permitting the pipe to further move inwards until the end face 62 is caught by and stopped with the stoppers, as shown in FIGS. 5 and 6.

Subsequent to such a preparatory step, start switches on a control panel or board (not shown) will be turned on to sequentially activate the oil-hydraulic cylinders 50 and 25. It will however be understood that unless the nut sensor 13 has detected any nut 61 at the releasing position 12, those cylinders can not start running.

Figure 7:
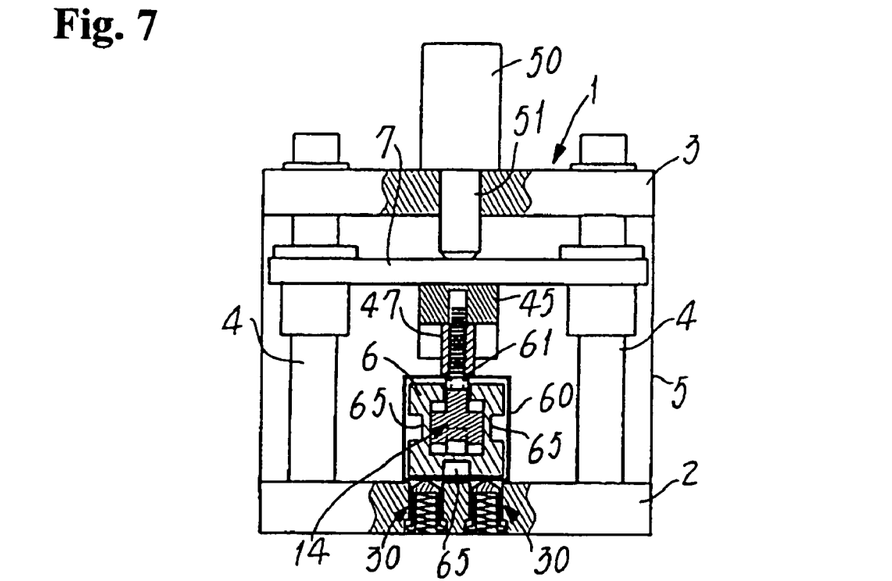
FIG. 7 is a partially cross-sectional front elevation of the press shown at the nut-fixing step during its operation, wherein a self-piercing nut is being fixedly attached to the pipe already set at the prescribed position.
Figure 8:
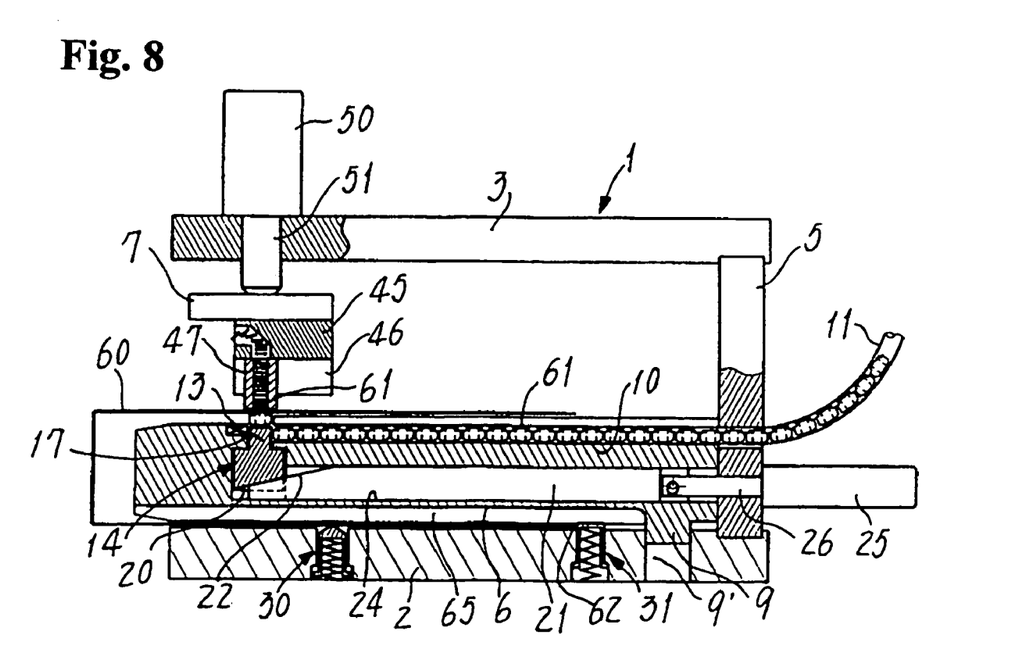
FIG. 8 is a partially cross-sectional side elevation of the press at such a nut-fixing step.
Figure 9:
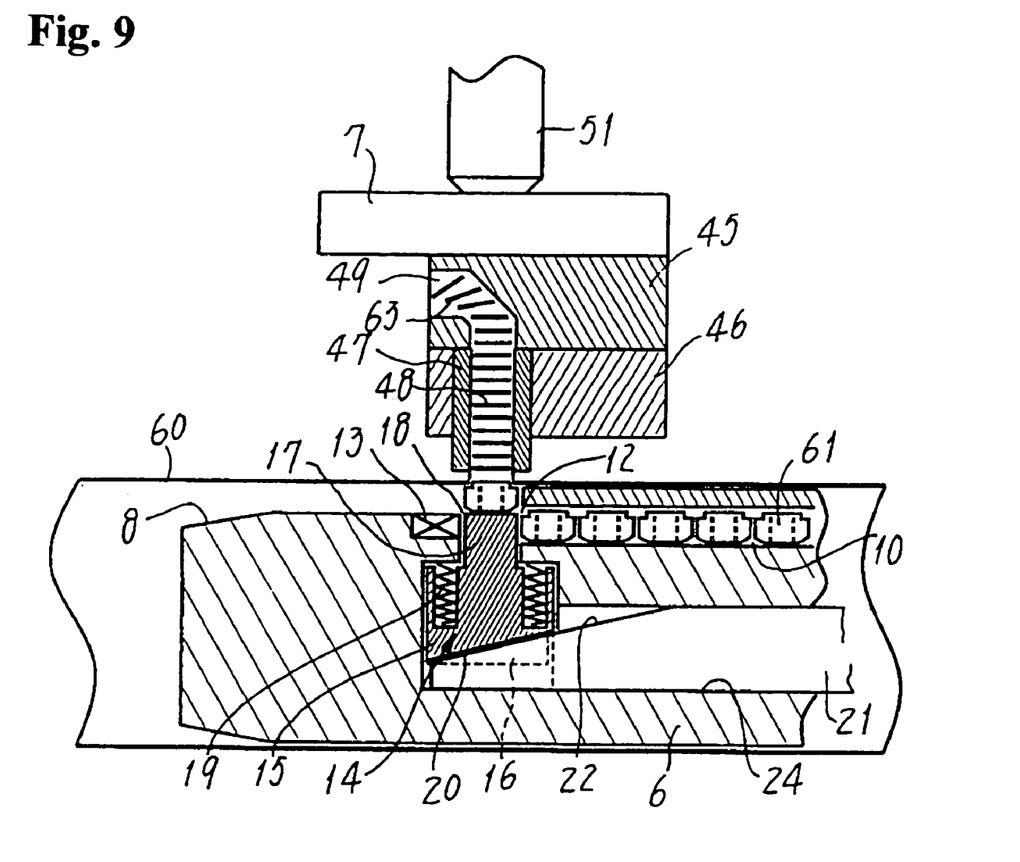
FIG. 9 is a partially cross-sectional side elevation of the press also shown at the nut-fixing step, with its relevant parts being shown on an enlarged scale.

Upon detection of the nut, followed by activation of the switches, the first mentioned oil-hydraulic cylinder 50 begins to work, prior to operation of the other cylinder 25. Thus, the caulking die 47 will be lowered together with the upper holder 7 so as to press the rectangular pipe 60 to the lower base 2. Subsequently, the other cylinder 25 commences its operation so that its piston rod 26 pushes the cam rod 21 towards the forward portion of lower holder 6. As a result, the oblique cam surface serving as the guide surface 22 will forcibly raise the pusher 14, with the punching portion 17 thereof press the nut 61 to the inner periphery of pipe 60 at the nut releasing position 12. As the nut 61 is further forced upwards, it cooperates with the caulking die 47 to punch a hole in the wall of said pipe. Consequently, the rim surrounding the hole is caulked by the die 47, thereby firmly fixing the nut 61 to said inner periphery of rectangular metal pipe 60. In other words, the punching of the pipe 60 effected by means of the nut itself 61 does take place at the same time as the caulking of the rim of a punched hole by means of the die 47. Such concurrent actions are ensured owing to the feature that a downward force imparted to the caulking die 47 from the oil-hydraulic cylinder 50 is designed stronger than an upward force imparted to the nut pusher 14 from the other cylinder 25 through the cam rod 21. On the other hand, scraps 63 severed by the nuts 61 from the rectangular pipe 60 and temporarily received in the bore 48 of die 47 will successively be discarded to the outside through the canal 49.

Figure 5:
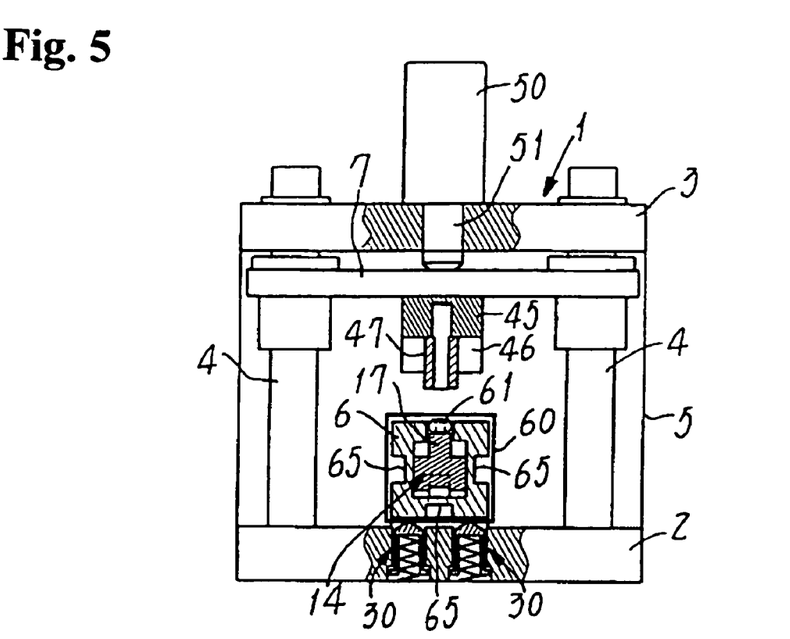
FIG. 5 is a partially cross-sectional front elevation of the press shown at the preparatory step during its operation, wherein a rectangular metal pipe has been set at its prescribed position before subjected to the succeeding steps.
Figure 6:
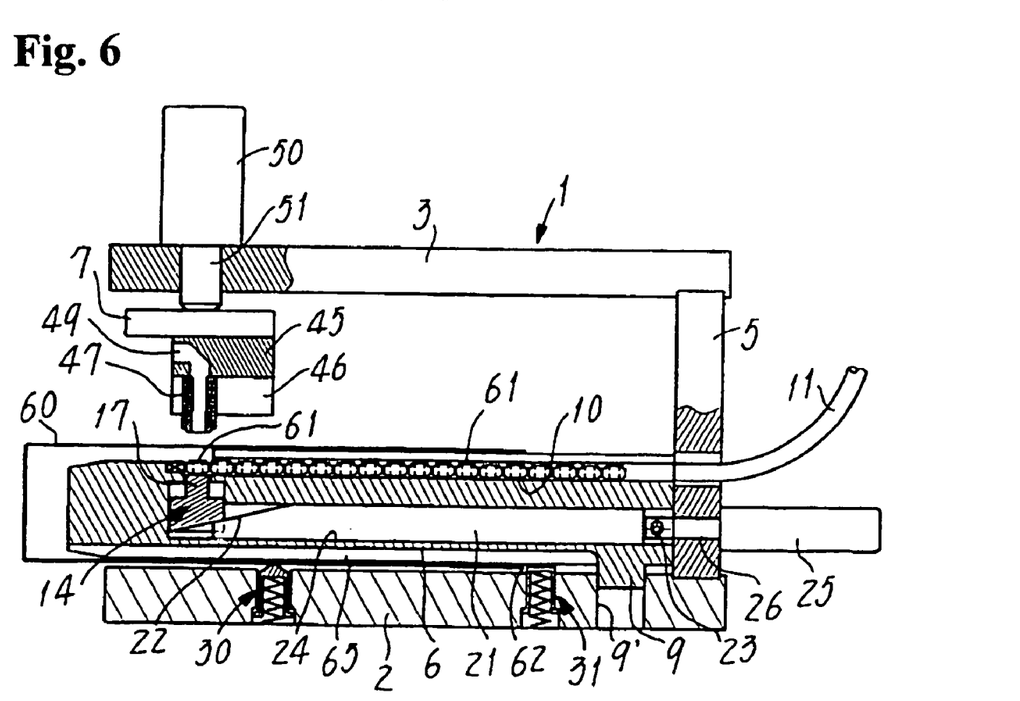
FIG. 6 is a partially cross-sectional side elevation of the press at such a preparatory step.

After the nut 61 has been attached to the pipe 60, both the cylinders 25 and 50 will become out of operation as shown in FIGS. 5 and 6. Then, the rectangular pipe 60 with the nut 61 attached thereto will be withdrawn from the lower holder 6. Finally, another pipe 60 will be put on this holder 6 so as to be ready for the next cycle of operation. In a case wherein plural nuts 61 are to be attached to one pipe 60, a succeeding nut 60 will be subjected to the same nut-fixing step as described above, after completion of attachment of the preceding nut 61. In another case wherein it is desired to attach further nuts to the remaining three sides of the pipe 60, the pipe 61 whose one side has one or more nuts 61 already attached thereto will be pulled out from the lower holder 6. This pipe is rotated an angle outside the press so that one of the remaining three sides faces upwards, before being put again on said holder 6 and subjected to the succeeding cycle. During such an operation, the nuts 61 already secured firmly to the pipe 60 can smoothly move in and along the relief grooves 65, without causing any troubles to the succeeding nut-fixing steps.

Although the above embodiment has been described for a case wherein a rectangular pipe 60 is processed to have he nuts 61 attached thereto, the lower holder 6 may be modified in its external configuration such that a round pipe or a profiled pipe can be treated with. The cam actuating means and the die driving means may not necessarily be oil-hydraulic cylinders as employed in the embodiment, but can be replaced with pneumatic cylinders, servomotors or any other proper pressing means.

The invention claimed is:

1. A press for attaching nuts to pipes comprising:
a frame and an elongated and generally cylindrical lower holder disposed in the frame and having a horizontal axis in parallel therewith,
the frame being composed of a lower base and an upper base, with the upper base being supported by guide posts and a rear wall, that are fixed upright on a front part and on a rear part of the lower base, respectively,
the lower holder capable of fitting in and temporarily holding a pipe, and having a basal portion supported on the rear part so as to rise and sink,
a forward portion of the lower holder extending to a position where it is generally in vertical alignment with the front part of the lower base,
lifters and stoppers, such that the lifters move up and down to bear against and support the forward portion of the lower holder so as to keep it lifted a slight distance, the stoppers also moving up and down to bear against and support an intermediate region of the lower holder in order to keep if lifted a slight distance, and further capable of bearing against an end of the pipe and retaining it at a prescribed horizontal position, a nut feed passage and a nut supply hose, with the passage being formed along the axis and in an upper outer surface of the lower holder, the nut supply hose being connected to a basal end of the feed passage extending from the basal portion to the forward portion of said holder, a nut sensor for detecting self-piercing nuts at a nut releasing position adjacent to a frontal end of the feed passage, a nut pusher disposed in the forward portion of the cylindrical lower holder so as to move perpendicularly to the axis thereof towards and away from the nut releasing position, a cam rod inserted in the lower holder and capable of moving axially thereof, the cam rod having a frontal end formed as an oblique cam surface always engaging with the nut pusher so as to drive it to the releasing position, a cam actuating means causing the cam rod to make axial reciprocation, an upper holder capable of moving up and down along the guide posts perpendicularly to the axis of the lower holder, a caulking die carried by the upper holder in a vertical alignment with the nut pusher, with the nut releasing position intervening between the caulking die and the nut pusher, and a die driving means disposed on the upper base in order to drive the upper holder to reciprocate perpendicularly to the axis of the lower holder, such that the driving means exerts a downward force urging downwards the caulking die is prescribed to be stronger than an upward force acting on the nut pusher.

2. A press as defined in claim 1, wherein the lifters have each a top formed as an inclined guide surface, and springs retained in the lower base urge upwards the lifters to bear against the lower holder, such that when a pipe is fitted on the lower holder, the guide surface will allow the pipe to move over it, while lowering the lifters.

3. A press as defined in claim 2, wherein the stoppers are touch sensors such that once the end face of a pipe fitted on the lower holder (6) do contact them so as to be accurately positioned, both the cam actuating and die driving means are automatically turned on.

4. A press as defined in claim 2, wherein the caulking die is connected by a die holder and a back plate to the upper holder, and a scrap discharging canal formed through the back plate is opened sideways in communication with a bore of the caulking die.

5. A press as defined in claim 2, wherein a locking lug protruding downwards from the basal portion of the lower holder fits in a locking groove formed in the lower base, thereby regulating the position of the lowering holder fore and aft and sideways, while permitting its free vertical motion.

6. A press as defined in claim 2, wherein the pipe being a rectangular one, both the opposite side walls as well as a bottom wall of the elongated and rectangularly-cylindrical lower holder have relief grooves that extend from the forward portion to basal portion of the holder so as to protect it from interference with any nuts already attached to the pipe, so that the nuts are attached to all the four parallel walls of the pipe.

7. A press as defined in claim 2, wherein the cam-actuating means is an oil-hydraulic cylinder that has a piston rod that is connect to the basal portion of the lower holder so that when the cylinder is activated, a distal end face of the piston rod thrusts the cam rod at its proximal end face, thereby causing a forward displacement of the cam rod towards the forward portion of the lower holder.

8. A press as defined in claim 2, wherein the die driving means is an oil-hydraulic cylinder whose piston rod is connected to the upper holder.

9. A press as defined in claim 1, wherein the cylindrical lower holder has a generally rectangular cross section in a plane perpendicular to the horizontal axis.

10. A press as defined in claim 9, wherein the pipe is a rectangular one, both the opposite side walls as well as a bottom wall of the elongated and cylindrical lower holder have relief grooves that extend from the forward portion to basal portion of the holder so as to protect it from interference with any nuts already attached to the pipe, so that the nuts are attached to all the four parallel walls of the pipe.

11. A press as defined in claim 1, wherein the stoppers are touch sensors such that once the end face of a pipe fitted on the lower holder (6) do contact them so as to be accurately positioned, both the cam actuating and die driving means are automatically turned on.

12. A press as defined in claim 1, wherein the caulking die is connected by a die holder and a back plate to the upper holder, and a scrap discharging canal formed through the back plate is opened sideways in communication with a bore of the caulking die.

13. A press as defined in claim 1, wherein a locking lug protruding downwards from the basal portion of the lower holder fits in a locking groove formed in the lower base, thereby regulating the position of the lowering holder fore and aft and sideways, while permitting its free vertical motion.

14. A press as defined in claim 1, wherein the pipe being a rectangular one, both the opposite side walls as well as a bottom wall of the elongated and rectangularly-cylindrical lower holder have relief grooves that extend from the forward portion to basal portion of the holder so as to protect it from interference with any nuts already attached to the pipe, so that the nuts are attached to all the four parallel walls of the pipe.

15. A press as defined in claim 1, wherein the cam-actuating means is an oil-hydraulic cylinder that has a piston rod that is connect to the basal portion of the lower holder so that when the cylinder is activated, a distal end face of the piston rod thrusts the cam rod at its proximal end face, thereby causing a forward displacement of the cam rod towards the forward portion of the lower holder.

16. A press as defined in claim 1, wherein the die driving means is an oil-hydraulic cylinder whose piston rod is connected to the upper holder.

* * * * *